United States Patent Office 3,689,289
Patented Sept. 5, 1972

3,689,289
CHICKEN FLAVOR AND PROCESS FOR PREPARING THE SAME
Marcel Andre Perret, Cutler Road, Greenwich, Conn. 06830
No Drawing. Continuation-in-part of applications Ser. No. 559,106, June 21, 1966, and Ser. No. 18,743, Mar. 11, 1970. This application May 24, 1971, Ser. No. 146,480
Int. Cl. A23l 1/26
U.S. Cl. 99—140 N                    16 Claims

ABSTRACT OF THE DISCLOSURE

An artificial chicken flavor and a process for preparing the same are provided, starting from a combination of a hexose, a bland protein hydrolyzate, and arachidonic acid compound, such as arachidonic acid, and/or methyl or ethyl arachidonate, and cysteine, cystine or a nontoxic acid addition salt thereof. The flavor is obtained by heating this mixture for up to ten minutes at a temperature within the range from about 60 to about 90° C.

---

This application is a continuation-in-part of Ser. No. 559,106, filed June 21, 1966, and now abandoned, and of Ser. No. 18,743, filed Mar. 11, 1970 now abandoned.

Artificial meat flavoring materials are available and are of two general types, those prepared from natural meat by an extraction and concentration process, and those prepared artificially by combining ingredients which when heated together at an elevated temperature for a long period of time produce a flavor more or less approximatnig the desired meat flavor.

Perret U.S. Pat. No. 3,365,306, patented Jan. 23, 1968, describes the process for preparation of beef extract from the meat tissue of slaughtered cattle as a time consuming and expensive process, which involves acid hydrolysis of the meat tissue, neutralization of the mixture, concentration of the mixture, and recovery of a brown, substantially completely hydrolyzed residue, the so-called beef extract.

Perret proposed a substitute artificial beef flavor formed by heating a hexose or pentose monosaccharide with cysteine and cystine to 90 to 100° C. for two hours in the presence of water, adding vegetable protein hydrolyzate and a 5'-ribonucleotide, and then heating again at at least 70° C. for about two hours, to develop the desired beef flavor.

Mortion et al. U.S. Pat. No. 2,934,437, patented Apr. 26, 1960, describe an artificial meat flavoring composition, composed of the reaction products of a pentose or hexose, cysteine or cystine, and water, reacted for at least one hour at the boiling point in the presence of water. This composition is similar to Perret's, without the ribonucleotide. Moreover, Perret requires that the mixture of hexose or pentose and cysteine or cystine be reacted at 90 to 100° C. in the presence of water, and that then the protein hydrolyzate and the ribonucleotide be added and a further reaction carried out at at least 70° C. for about two hours.

Giacino U.S. Pat. No. 3,394,017, patented July 23, 1968, describes a poultry flavor composition produced by reacting thiamine with a sulfur-containing polypeptide or an amino acid mixture derived therefrom, and thereafter adding an aldehyde and a ketone to the reaction product. An amino acid mixture for use in the composition includes at least one sulfur-containing amino acid such as cysteine or cystine. The mixture is heated at from 200 to 420° F. for from ¼ minute to three hours, the shorter heating times requiring higher reaction temperatures.

One of the difficulties in preparing artificial flavors based on proteins or hydrolyzed proteins is the relative instability of the reaction product after heating at an elevated temperature. The product normally has a rather short shelf life, and deteriorates rapidly in flavor with storage. Morton states, for insance, that in his products, "The flavoring substance may tend to lose quality after about a month from its preparation."

Belikov et al., Chemical Abstracts 62, 15339d (1965), (Zh. Vses, Khim. Obshchestva im. D. I. Menedeleeva) 10 (1) 120 (1065), in a study of the nature of food odors, reported that an aqueous solution of 1-cysteine hydrochloride, dl-alanine, 1-glutamic acid, glycine, glucose, 1-arabinose and methyl arachidonate, after having been heated for two hours at 125 to 135° C. developed an odor resembling that of chicken soup. There was no report on the taste of the product.

In accordance with the invention, an artificial chicken flavor composition is provided which is capable of developing the flavor of chicken when heated in the presence of water for from five to ten minutes at temperatures within the range from about 60 to about 90° C. The composition can be formulated as a solid mixture, any liquids present being absorbed on the solid ingredients, and is stable indefinitely in this form, and develops a chicken flavor when heated under the stated conditions. Accordingly, this composition is well suited for use by a housewife, who merely heats it at the time of use, and then can use it at once, without any need for storage, after the chicken flavor has been developed. This avoids the necessity of pre-heating the composition by the manufacturer, and eliminates the storage stability problems inherent in such preheated compositions. Since the composition can be heated under conditions available to the housewife in the ordinary kitchen, unlike the 125 to 135° C. temperatures of Belikov et al. (which require pressure), the compositions of the invention avoid all of the difficulties inherent in the prior flavoring compositions.

The artificial chicken flavor composition of the invention is a combination of a hexose, a bland protein hydrolysate, an arachidonic acid compound, such as arachidonic acid, or methyl and/or ethyl arachidonate, or a mixture of any thereof, and cysteine and/or cystine, or a nontoxic acid addition salt thereof. The hexose is employed in an amount within the range from about 0.2 to about 2 parts per part of protein hydrolysate, the arachidonic acid compound in an amount within the range from about 0.001 to about 0.1% by weight of the total composition, and the cysteine, cystine, nontoxic acid addition salt, or mixture thereof, is in an amount within the range from about 0.05 to about 0.5% by weight of the total composition.

The invention also provides a process for preparing an artificial chicken flavor, if desired in situ in the foodstuff being flavored, which comprises blending a hexose, a bland protein hydrolysate, an arachidonic acid compound, and cysteine and/or cystine or nontoxic acid addition salt thereof, and then heating the mixture in the presence of water at a temperature within the range from about 60 to 90° C. for a time within the range from about 5 to about 10 minutes. The result is a synthetic chicken flavor of remarkable quality.

Arachidonic acid, 5, 8, 11, 14-eicosotetraenoic acid, $$CH_3(CH_2)_4(CH=CHCH_2)_4CH_2CH_2COOH$$

is known to occur in liver, brain, glandular organs and depot fats of animals and to be a constituent of animal phosphatides. The acid itself, and/or methyl and/or ethyl esters of this acid, taken separately or together, in any admixture thereof, are an essential ingredients in the compostions of the invention in imparting an artificial chicken flavor to the composition, and it is rather remarkable that in the small amounts employed, within the range from about 0.001 to about 0.1% by weight of the total composition, they have this effect on taste. These compounds are liquids, but in the small amounts used are wholly absorbed on the solid ingredients of the composition.

Cysteine, β-mercapto alanine, 2-amino-3-mercaptopropionic acid, and cystine, 3,3'-dithio-bis-2-aminopropionic acid, β,β - dithiodialanine, are both sulfur - containing amino acids, and can be used individually or in admixture, preferably in the form of their acid addition salts, which have greater solubility in water than the acids. These also are essential to the development of the artificial chicken flavor, when the composition is heated, in the small amounts within the range from about 0.05 to about 0.5% by weight of the total composition.

Any hexose can be employed. Glucose or dextrose, mannose, galactose, and fructose are exemplary. These can be used alone or in admixture. Also, pentoses such as ribose, arabinose and xylose can be employed, in admixture with the hexose, but in a minor proportion. Dextrose is particularly effective in producing a boiled chicken flavor, and is preferred for this purpose.

The protein hydrolysate that is used in peptide non-ultimate amino acid form and should have a low or bland flavor. To obtain such a flavor it is usually necessary to deflavor the protein source, particularly if it is derived from fish or soya beans, or other strong-flavored proteinaceous material. Exemplary are hydrolyzed vegetable proteins derived from peanuts or soya beans, hydrolyzed animal proteins such as hydrolyzed deflavored cod flesh, keratin protein, as well as the hydrolyzed plant proteins occurring in cereal grain, such as wheat and known as gluten. The protein hydrolysates generally comprise the constituent amino acids in peptide non-ultimate amino acid form, representative of the source protein in the complex mixture in which they occur naturally, and in this respect differ significantly from individual mixtures of amino acids prepared synthetically, which are not effective in the compositions of the invention. It has surprisingly been found, for instance, that a mixture of amino acids, such as β-alanine, glutamic acid and glycine, even in combination with cysteine or cystine does not produce a synthetic chicken flavor when heated in accordance with the invention for up to ten minutes at temperatures up to 90° C. Consequently, the use of a bland or low flavor protein hydrolysate also is essential in developing the artificial chicken flavor of the invention.

Moreover, possibly because of the use of hydrolyzed naturally-occurring protein sources, it is also essential that the compositions of the invention not be heated at a temperature in excess of 100° C. for a time in excess of about 10 minutes, since the chicken flavor developed under the heating conditions of the invention is effectively destroyed by excessive heating for a longer time or at a more elevated temperature.

As indicated, the flavoring compositions of the invention can be formulated as solid blends, and marketed as such. The liquid arachidonic acid or methyl or ethyl arachidonate is wholly absorbed on the hexose, protein hydrolysate and cysteine or cystine, which are all solids. The compositions are thus easily formulated by mixing the components to form a homogeneous mixture. This mixture when dissolved in water in an amount within the range from about 1 to about 15%, and preferably from about 2.5 to about 4.5%, and heated at from about 60 to about 90° C. for up to ten minutes, then develops an artificial chicken flavor, as desired. Accordingly, this mixture can be blended by the housewife with any mixture of food ingredients to which the chicken flavor is to be imparted, or in which the already existing chicken flavor is to be accentuated or enhanced. The resulting mixture when heated under the conditions stated develops the artificial chicken flavor, and this flavor is invariably fresh and pleasing because in fact it has been freshly prepared.

In addition to the above ingredients, which are essential ingredients of the compositions of the invention, there can also be employed flavor-enhancing ingredients of conventional types, such as monosodium glutamate, Mertaste (5'-inosinic acid and 5'-guanylic acid), spices of various types, ribonucleotides, vegetable oils and lactose. These are added in small amounts, according to taste, and any or all of these can be included.

The following examples in the opinion of the inventor represent preferred embodiments of the invention.

EXAMPLE 1

The following ingredients are blended together into a uniform granular powder:

| Ingredients: | Grams |
|---|---|
| Monosodium glutamate | 30 |
| Dextrose | 50 |
| NaCl | 50 |
| l-cysteine hydrochloride | 0.5 |
| Hydrolyzed vegetable protein (Nestle 3H3 Paste) | 30 |
| Flour | 10 |
| Vegetable oil | 10 |
| Ribonucleotides | 0.05 |
| Methyl arachidonate | 0.02 |
| Spices | 0.02 |

Two tablespoons of this mixture are added to 500 cc. of water, and simmered for about seven minutes, to produce a boiled chicken flavor. Here, the chicken flavor is not preformed in the initial dry mix.

EXAMPLE 2

A mixture of the following ingredients is blended into a uniform granular powder:

| Ingredients: | Grams |
|---|---|
| Monosodium glutamate | 30 |
| Dextrose | 50 |
| NaCl | 50 |
| l-cysteine hydrochloride | 0.5 |
| Defatted soyabean protein | 30 |
| Flour | 10 |
| Vegetable oil | 10 |
| Ribonucleotides | 0.05 |
| Methyl arachidonate | 0.01 |
| Spices | 0.02 |

One tablespoon of this mixture is added to 200 cc. of water, and heated at 90° C. for about five minutes, to produce a boiled chicken flavor. Here, the chicken flavor is not preformed in the initial dry mix.

EXAMPLE 3

The following ingredients are blended together into a uniform granular powder:

| Ingredients: | Grams |
|---|---|
| Dextrose | 50 |
| l-cysteine hydrochloride | 0.5 |
| Hydrolyzed vegetable protein (Nestle 3H3 Paste) | 30 |
| Ethyl arachidonate | 0.02 |

One tablespoon of this mixture is added to 250 cc. of water, and heated at 60° C. for about ten minutes, to produce a boiled chicken flavor.

EXAMPLE 4

The following ingredients are blended together into a uniform granular powder:

| Ingredients: | Grams |
|---|---|
| Monosodium glutamate | 30 |
| Dextrose | 50 |
| NaCl | 50 |
| 1-cysteine hydrochloride | 0.5 |
| Hydrolyzed vegetable protein (Nestle 3H3 Paste) | 30 |
| Flour | 10 |
| Vegetable oil | 10 |
| Ribonucleotides | 0.05 |
| Arachidonic acid | 0.02 |
| Spices | 0.02 |

Two tablespoons of this mixture are added to 500 cc. of water, and simmered for about seven minutes, to produce a boiled chicken flavor. Here, the chicken flavor is not preformed in the initial dry mix.

EXAMPLE 5

A mixture of the following ingredients is blended into a uniform granular powder:

| Ingredients: | Grams |
|---|---|
| Monosodium glutamate | 30 |
| Dextrose | 50 |
| NaCl | 50 |
| 1-cysteine hydrochloride | 0.5 |
| Defatted soyabean protein | 30 |
| Flour | 10 |
| Vegetable oil | 10 |
| Ribonucleotides | 0.05 |
| Arachidonic acid | 0.01 |
| Spices | 0.02 |

One tablespoon of this mixture is added to 200 cc. of water, and heated at 90° C. for about five minutes, to produce a boiled chicken flavor. Here, the chicken flavor is not preformed in the initial dry mix.

EXAMPLE 6

The following ingredients are blended together into a uniform granular powder:

| Ingredients: | Grams |
|---|---|
| Dextrose | 50 |
| 1-cysteine hydrochloride | 0.5 |
| Hydrolyzed vegetable protein (Nestle 3H3 Paste) | 30 |
| Arachidonic acid | 0.02 |

One tablespoon of this mixture is added to 250 cc. of water, and heated at 60° C. for about ten minutes, to produce a boiled chicken flavor.

Having regard to the foregoing disclosure, the following is claimed as the inventive and patentable embodiments thereof:

1. An artificial chicken flavor composition in soild particulate form, capable of developing the flavor of chicken when heated in the presence of water for from five to ten minutes at temperatures within the range from about 60 to about 90° C., comprising hexose, a bland protein hydrolysate in peptide non-ultimate amino acids form, an arachidonic acid compound selected from the group consisting of arachidonic acid, methyl or ethyl arachidonate and mixtures thereof, and cysteine and/or cystine, or a nontoxic acid addition salt thereof, the hexose being in an amount within the range from about 0.2 to about 2 parts per part of the protein hydrolysate, the arachidonic acid compound being in an amount within the range from about 0.001 to about 0.1% by weight of the total composition, and the cysteine, cystine, nontoxic acid addition salt, or mixture thereof, being in an amount within the range from about 0.05 to about 0.5% by weight of the total composition.

2. A composition according to claim 1, in which the hexose is selected from dextrose, mannose, galactose, and fructose.

3. A composition according to claim 1, comprising a pentose in admixture with the hexose, the pentose being in a minor proportion.

4. A composition according to claim 1, in which the protein hydrolysate is derived from fish or soya beans.

5. A composition according to claim 1, formulated as a solid blend, with the liquid arachidonic acid compound wholly absorbed on the solids present.

6. A composition according to claim 1, comprising a flavor-enhancing ingredient selected from the group consisting of monosodium glutamate, 5'-inosinic acid and 5'-guanylic acid, ribonucleotides, spices, vegetable oils and lactose.

7. A composition according to claim 1 in which the arachidonic acid compound comprises methyl arachidonate.

8. A composition according to claim 1 in which the arachidonic acid compound comprises ethyl arachidonate.

9. A composition according to claim 1 in which the arachidonic acid compound comprises arachidonic acid.

10. A composition according to claim 1, comprising monosodium glutamate, dextrose, NaCl, 1-cysteine hydrochloride, hydrolysed vegetable protein, flour, vegetable oil, ribonucleotides, methyl arachidonate, and spices.

11. A composition according to claim 1, comprising vegetable oil, hydrolysed vegetable protein, 1-cysteine hydrochloride, ribose, dextrose, ribonucleotides, methyl arachidonate, monosodium glutamate and lactose.

12. A boiled chicken flavoring composition obtained by simmering the dry mix to claim 1 in the proportion of about 0.5 to about 5 parts by weight per 100 parts by weight of water for from five to ten minutes at from about 60 to about 90° C.

13. A process for preparing an artificial chicken flavor, if desired in situ in the foodstuff being flavored, which comprises blending a hexose, a bland protein hydrolysate, in peptide, non-ultimate amino acids form, an arachidonic acid compound selected from the group consisting of adachidonic acid, methyl or ethyl arachidonate and mixtures thereof, and cysteine and/or cystine or nontoxic acid addition salt thereof, and then heating the mixture in the presence of water at a temperature within the range from about 60 to 90° C. for a time within the range from about 5 to about 10 minutes.

14. A process according to claim 13 in which the arachidonic acid compound is methyl arachidonate.

15. A process according to claim 13 in which the arachidonic acid compound is ethyl arachidonate.

16. A process according to claim 13 in which the arachidonic acid compound is arachidonic acid.

References Cited

UNITED STATES PATENTS

| 2,934,437 | 4/1960 | Morton et al. | 99—140 |
| 3,365,306 | 1/1968 | Perret | 99—140 |
| 3,394,017 | 7/1968 | Giacino | 99—140 |

FOREIGN PATENTS

Belikov et al.: "Nature Of Some Food Odors," Chemical Abstracts, vol. 62, 15339d (1965).

MORRIS O. WOLK, Primary Examiner

W. BOVEE, Assistant Examiner

UNITED STATES PATENT OFFICE
CERTIFICATE OF CORRECTION

Patent No. 3,689,289      Dated September 5, 1972

Inventor(s) Marcel Perret

It is certified that error appears in the above-identified patent and that said Letters Patent are hereby corrected as shown below:

| | |
|---|---|
| Column 1, lines 33 and 34 : | "approximat-nig" should be --approximat-ing-- |
| Column 1, line 50 : | "Mortion" should be --Morton-- |
| Column 2, line 17 : | "(1065)" should be --(1965)-- |
| Column 5, line 34 Example 5 : | "1-cysteine hydrochloide" should be --1-cysteine hydrochloride-- |
| Column 6, line 48 Claim 13 : | "adachidonic" should be --arachidonic-- |

Signed and sealed this 13th day of February 1973.

(SEAL)
Attest:

EDWARD M. FLETCHER, JR.
Attesting Officer

ROBERT GOTTSCHALK
Commissioner of Patents